US011032698B2

(12) United States Patent
Bravo et al.

(10) Patent No.: US 11,032,698 B2
(45) Date of Patent: Jun. 8, 2021

(54) GESTURE BASED SMART DOWNLOAD

(71) Applicant: International Business Machines Corporation, Armonk, NY (US)

(72) Inventors: Elianne A. Bravo, Hopewell Junction, NY (US); Heidi Lagares-Greenblatt, Jefferson Hills, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 415 days.

(21) Appl. No.: 15/335,665

(22) Filed: Oct. 27, 2016

(65) Prior Publication Data

US 2018/0121073 A1    May 3, 2018

(51) Int. Cl.
*H04W 8/24*     (2009.01)
*G06F 3/0488*   (2013.01)
*H04M 1/725*    (2021.01)
*H04M 1/72412*  (2021.01)

(52) U.S. Cl.
CPC ............ *H04W 8/24* (2013.01); *G06F 3/0488* (2013.01); *H04M 1/72412* (2021.01); *H04M 2250/64* (2013.01)

(58) Field of Classification Search
CPC .............................. G06F 3/04883; H04W 8/24
See application file for complete search history.

(56) References Cited

U.S. PATENT DOCUMENTS

| | | | | |
|---|---|---|---|---|
| 6,092,114 A * | 7/2000 | Shaffer | ................ | G06Q 10/107 707/999.001 |
| 6,708,217 B1 * | 3/2004 | Colson | ................ | H04L 67/2823 709/203 |
| 7,107,275 B2 * | 9/2006 | Quinn | ................. | G06F 9/44505 |
| 7,965,706 B2 * | 6/2011 | Iwakawa | ............... | H04L 69/329 370/360 |
| 8,312,392 B2 * | 11/2012 | Forutanpour | ........... | H04W 4/21 715/863 |
| 8,499,258 B1 * | 7/2013 | Cho | .................... | G06F 3/04883 715/773 |
| 8,964,947 B1 * | 2/2015 | Noolu | ................... | H04M 3/541 379/88.01 |
| 9,335,862 B1 * | 5/2016 | Kritt | ..................... | G06F 3/0416 |
| 9,537,921 B2 * | 1/2017 | Zhang | .................. | H04L 65/602 |
| 9,571,625 B2 * | 2/2017 | Kim | ..................... | H04M 1/7253 |

(Continued)

OTHER PUBLICATIONS

Disclosed Anonymously, "Cross device gesture for data transfer", IPCOM000216194D, Mar. 23, 2012, 3 pages.

*Primary Examiner* — Jeremy L Stanley
(74) *Attorney, Agent, or Firm* — Cantor Colburn LLP; Teddi Maranzano

(57) ABSTRACT

An aspect includes detecting a user gesture at a sender device, the user gesture indicating a direction relative to the sender device. One or more candidate receiver devices in the indicated direction and in a line-of-sight of the sender device are located. The data to be transferred by the sender device and an action to be performed on the data are identified. It is determined whether any of the one or more candidate receiver devices are configured to accept the data and to perform the action. The data is transferred to a selected one of the one or more candidate receiver devices based on determining that the selected candidate receiver device is configured to accept the data and to perform the action.

20 Claims, 4 Drawing Sheets

(56) References Cited

U.S. PATENT DOCUMENTS

| | | | |
|---|---|---|---|
| 9,749,395 B2* | 8/2017 | Dawson | G06Q 10/10 |
| 9,827,714 B1* | 11/2017 | Ruxton | G06Q 30/0621 |
| 2002/0120693 A1* | 8/2002 | Rudd | H04L 51/066 |
| | | | 709/206 |
| 2005/0086326 A1* | 4/2005 | Manning | G06F 21/10 |
| | | | 709/219 |
| 2006/0026288 A1* | 2/2006 | Acharya | G06Q 10/10 |
| | | | 709/227 |
| 2006/0028429 A1* | 2/2006 | Kanevsky | G06F 3/011 |
| | | | 345/156 |
| 2006/0146765 A1* | 7/2006 | Van De Sluis | G06F 3/016 |
| | | | 370/338 |
| 2007/0202923 A1* | 8/2007 | Jung | H04L 67/16 |
| | | | 455/566 |
| 2007/0268517 A1* | 11/2007 | Koarai | G06F 3/1204 |
| | | | 358/1.15 |
| 2008/0133675 A1* | 6/2008 | Ramanathan | H04L 51/04 |
| | | | 709/206 |
| 2008/0152263 A1* | 6/2008 | Harrison | G06F 1/1626 |
| | | | 382/313 |
| 2008/0178126 A1* | 7/2008 | Beeck | G06F 3/017 |
| | | | 715/863 |
| 2008/0309632 A1* | 12/2008 | Westerman | G06F 3/038 |
| | | | 345/173 |
| 2009/0140986 A1* | 6/2009 | Karkkainen | G06F 3/0486 |
| | | | 345/173 |
| 2009/0244015 A1* | 10/2009 | Sengupta | H04W 4/21 |
| | | | 345/173 |
| 2010/0083189 A1* | 4/2010 | Arlein | G06F 3/017 |
| | | | 715/863 |
| 2010/0257251 A1* | 10/2010 | Mooring | H04W 4/21 |
| | | | 709/216 |
| 2011/0001686 A1* | 1/2011 | Belvin | G06F 3/1454 |
| | | | 345/2.2 |
| 2011/0081923 A1* | 4/2011 | Forutanpour | H04W 4/21 |
| | | | 455/457 |
| 2011/0083111 A1* | 4/2011 | Forutanpour | H04W 4/21 |
| | | | 715/863 |
| 2011/0113097 A1* | 5/2011 | Takeuchi | H04N 1/00183 |
| | | | 709/204 |
| 2011/0163944 A1* | 7/2011 | Bilbrey | G01D 21/02 |
| | | | 345/156 |
| 2011/0320963 A1* | 12/2011 | Wong | H04N 21/43615 |
| | | | 715/755 |
| 2012/0131458 A1* | 5/2012 | Hayes | H04W 4/21 |
| | | | 715/716 |
| 2012/0239618 A1* | 9/2012 | Kung | G06F 21/6218 |
| | | | 707/621 |
| 2012/0304114 A1* | 11/2012 | Wong | G06F 3/0488 |
| | | | 715/800 |
| 2013/0155237 A1* | 6/2013 | Paek | G06F 1/1632 |
| | | | 348/148 |
| 2014/0053054 A1* | 2/2014 | Shen | G06F 16/9577 |
| | | | 715/234 |
| 2014/0056172 A1* | 2/2014 | Lee | H04W 4/70 |
| | | | 370/254 |
| 2014/0282106 A1* | 9/2014 | Smith | G06F 16/176 |
| | | | 715/753 |
| 2014/0292652 A1* | 10/2014 | Imai | B60R 16/027 |
| | | | 345/156 |
| 2014/0365980 A1* | 12/2014 | Morrison | G06F 3/017 |
| | | | 715/863 |
| 2014/0368601 A1* | 12/2014 | deCharms | H04W 4/021 |
| | | | 348/14.02 |
| 2015/0009152 A1* | 1/2015 | Tang | G09G 5/12 |
| | | | 345/173 |
| 2015/0022857 A1* | 1/2015 | Tsugimura | G06F 3/1244 |
| | | | 358/1.15 |
| 2015/0022861 A1* | 1/2015 | Oguro | G06K 15/1815 |
| | | | 358/1.16 |
| 2015/0106709 A1* | 4/2015 | Kritt | G06F 3/04883 |
| | | | 715/708 |
| 2015/0128067 A1* | 5/2015 | Wong | G06F 3/0486 |
| | | | 715/748 |
| 2015/0201443 A1* | 7/2015 | Emani | H04B 10/1143 |
| | | | 370/338 |
| 2015/0296355 A1* | 10/2015 | Lovitt | H04M 3/56 |
| | | | 455/416 |
| 2015/0326705 A1* | 11/2015 | Garnham | G06F 3/0488 |
| | | | 715/748 |
| 2016/0334879 A1* | 11/2016 | Hirano | G06F 3/017 |
| 2017/0093780 A1* | 3/2017 | Lieb | G06T 3/40 |
| 2017/0155958 A1* | 6/2017 | Fu | G11B 27/105 |
| 2017/0264956 A1* | 9/2017 | Gerhards | H04N 21/4583 |
| 2018/0113699 A1* | 4/2018 | Hunter | H04N 21/478 |

* cited by examiner

GESTURE BASED SMART DOWNLOAD

BACKGROUND

The present invention relates to transferring data, and more specifically, to gesture based smart download of data from a sender device to a receiver device.

SUMMARY

Embodiments include a method, system, and computer program product for gesture based smart download of data. A method includes detecting a user gesture at a sender device, the user gesture indicating a direction relative to the sender device. One or more candidate receiver devices in the direction relative to the sender device and in a line-of-sight of the sender device are located. The data to be transferred by the sender device and an action to be performed on the data are identified. It is determined whether any of the one or more candidate receiver devices are configured to accept the data and to perform the action. The data is transferred to a selected one of the one or more candidate receiver devices based on determining that the selected candidate receiver device is configured to accept the data and to perform the action. Based on determining that none of the one or more candidate receiver devices are configured to accept the data and to perform the action, indicating to the user that no line-of-sight devices are available to accept the data and to perform the action.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein provide an easy way to share data between devices that are in line-of-sight of each other. In accordance with one or more embodiments, instead of having to go through a set of steps with different applications to move data from a sender device to a receiver device, a user gesture at the sender device is used to identify both the data to be moved and the receiver device. One or more embodiments can be used in conjunction with cloud computing in order to increase privacy between devices and data downloads. If the user at the sender device has access to multiple devices (e.g., via the cloud), the user can activate a transfer of data with just a gesture (e.g., air gesture, touch gesture). In accordance with one or more embodiments, a determination is made about whether the receiver device can accept the data format and can perform a specified action on the data (e.g., display, play game) before transferring the data to the receiver device In one or more embodiments, a user arrives at her home playing a video game on her smart phone and wants to move the video game to a larger display on a desk top computer. In this example, both the smart phone and the desk top computer are connected to a cloud network that is set up in the user's home. To move the video game to the desktop computer the user can swipe the touch screen of the smart phone in the direction of the desktop computer, the video game will be moved, and the user can continue playing the video game on the desktop computer. In the background, the system verifies (performs authentication) that the desktop computer can support the video game data and the action of playing the video game. In this example, this information is known by the system because both devices are connected to the cloud.

In another example, a user is watching a movie at home in their living but they need to go to another room (e.g., kitchen, laundry room). Instead of pausing the movie, they can perform a specific gesture (the transfer data gesture with line-of-sight), to transfer the data and the data packets of the actions being taken (such as the movie playing) and pass that to their mobile phone to take to the other room. In one or more embodiments, both devices are synchronized and displaying the same movie at the same time. In one or more other embodiments, the data gets fully transferred to the mobile phone so the movie is only playing in the mobile device.

Figure 1:
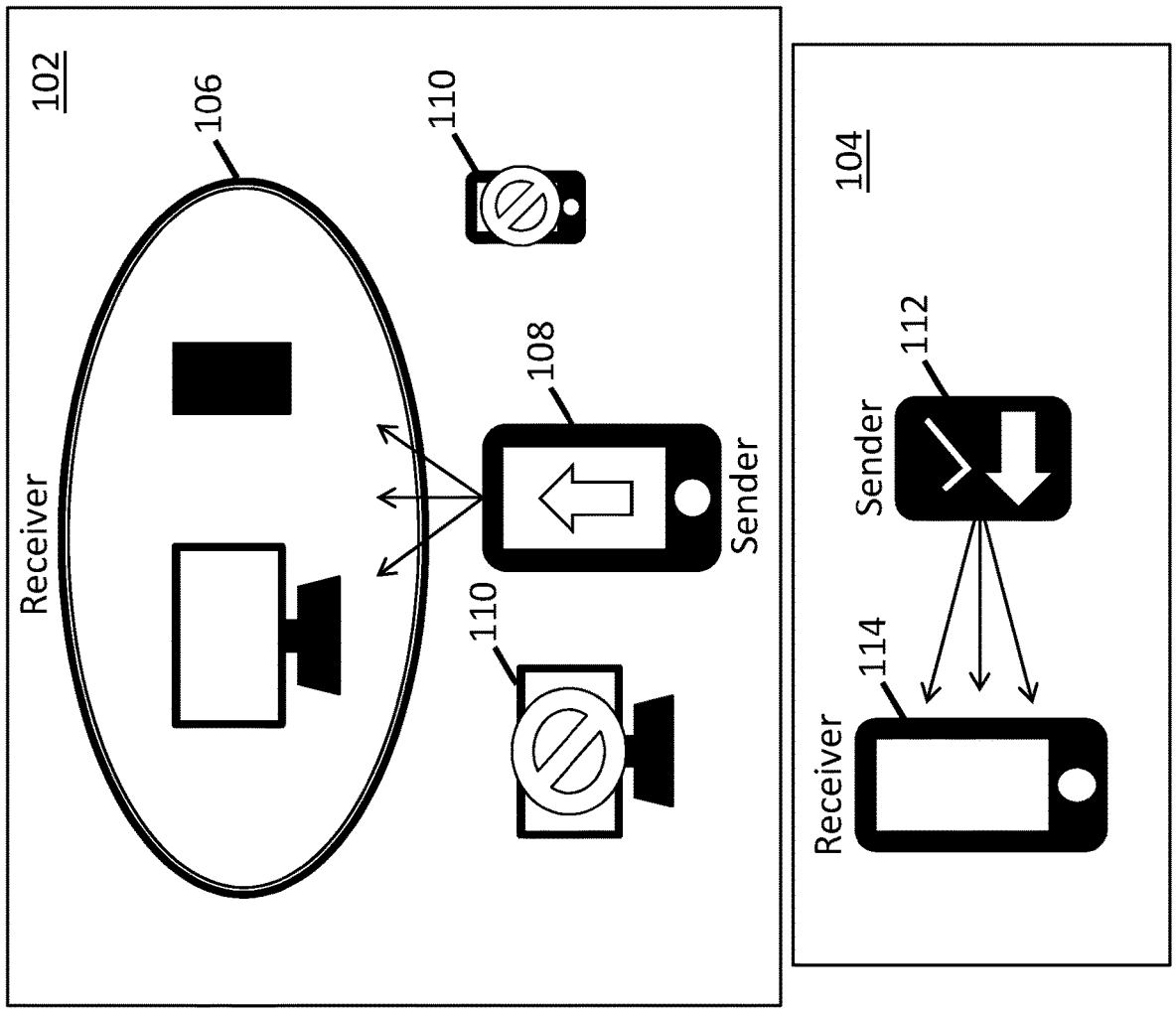
FIG. 1 illustrates a block diagram of gesture based smart download in accordance with one or more embodiments.

Turning now to FIG. 1, a block diagram 100 of gesture based smart download is generally shown in accordance with one or more embodiments. Block 102 of FIG. 1 shows a sender device 108 with an arrow representing a forward direction indicated by a user gesture, a plurality of receiver devices 106 that are in the direction indicated by the user gesture and in line-of-sight of the sender device 108, and a plurality of other devices 110 that are in line-of-sight of the sender device 108 but not in the direction indicated by the user gesture. The user gesture can include, but is not limited to: a swipe on a touch screen; an air motion recorded by a camera in the sender device 108; and a movement of the sender device (e.g., a tilt or flick in a direction of a receiver device, a sequence of movements).

As used herein the term "line-of-sight" refers to a line from a sender device to a receiver device that is unobstructed by any obstacles. A sender device is in line-of-sight of a receiver device when they are in view of each other without any sort of obstacle (e.g., wall, other device) between them. The sender and receiver devices can be implemented by any computing device capable of sending and receiving data, such as, but not limited to: a laptop computer, a cellular telephone (e.g., a smart phone), a display, a desktop computer, and a gaming device.

As used herein, the direction indicated by a user gesture can be within plus or minus a number of degrees of a straight line. As shown in block 102 of FIG. 1, the user has swiped the touch screen of the sender device 108 in a straight line indicated by the arrow on the sender device. In one or more embodiments, the direction of the user gesture relative to the sender device 108 is expanded to include, as shown in FIG. 1 by the three arrows between the sender device 108 and the receiver devices 106, an area that includes, but is wider than the straight line by some number of degrees (e.g., 45 degrees to each side of the straight line, 30 degree to each side of the straight line). As shown in FIG. 1, this expansion of the straight line depicted by the arrow in the sender device 108 to the direction indicated by the user gesture picks up receiver devices 106 but not the other devices 110 which are outside of the arc that represents the expansion of the straight line (e.g., the direction indicated by the user gesture). The size of the arc forming the direction indicated by the user gesture can be adjusted (e.g., by the user, automatically by the system) for example, based on an expected or actual number of devices in proximity to the sender device. The system described herein can evaluate the receiver devices 106 that are located in the direction indicated by the user gesture as candidates for the data transfer.

Block 104 of FIG. 1 depicts a sender device 112, a direction indicated by the user gesture that is in a non-forward direction (in this example, sideways) from the sender device 112, and a single receiver device 114 in the direction indicated by the user gesture. In one or more embodiments the sender device 112 may have multiple directions for the signal to travel, not only from the top of the sender device 112, but also, for example from the top, right, left, bottom of the sender device 112.

In accordance with one or more embodiments, a user can perform a gesture (touch or air) over their device and start a line-of-sight communication with another device(s) in order to smartly decide the receiver device. Infrared technology (IR) can be used to locate a candidate receiver device(s), by allowing a user to make a gesture between devices in order to initiate a transfer of data. Other technologies such as, but not limited to: global positioning system (GPS) technologies and near field communication (NFC) technologies can be used to locate a candidate receiver device(s). In one or more embodiments, the system uses special tuning between devices in order to only allow specific devices for the data transfers/downloads in the line-of-sight. For example, when using IR, the system can be tuned to a specific range(s) for a specific type(s) of data downloads, such as social media photos, movies, and videos, for example.

As shown in the embodiments of FIG. 1, the user can use their device (the "sender device") as the initiator for a transaction between the sender device and a receiver device. The receiver device receives the request from the sender device and sends information back to the sender device that indicates whether it can accept the data (size, data, format, etc.) and whether it can perform a specified action on the data (display, execute a specified program, etc.). If the transaction is accepted by both the sender device and the receiver device, then the transaction will take place. In one or more embodiments, the user can decide if the data will be shared on both devices or if the data should be deleted from the sender device once it is transferred to the receiver device.

In one or more embodiments, the user is logged on to both the sender device and the receiver device(s) and authentication is performed at the cloud level by a log-on to the cloud. In one or more embodiments, the user is logged on to both the sender and the receiver device(s) and the authentication is performed automatically by the location of the user in reference to the devices based on an access key owned by the user. The protocols used in this case can be access or password protocols. Examples of authentication protocols that can be used include, but are not limited to, point to point protocols (PPP) and password authentication protocols (PAP). A PPP can be used to help in validating and identifying remote clients and giving them access to data. The PAPs can be initialized by the users by sending a packet of data along with credentials (such like username and password).

Figure 2:
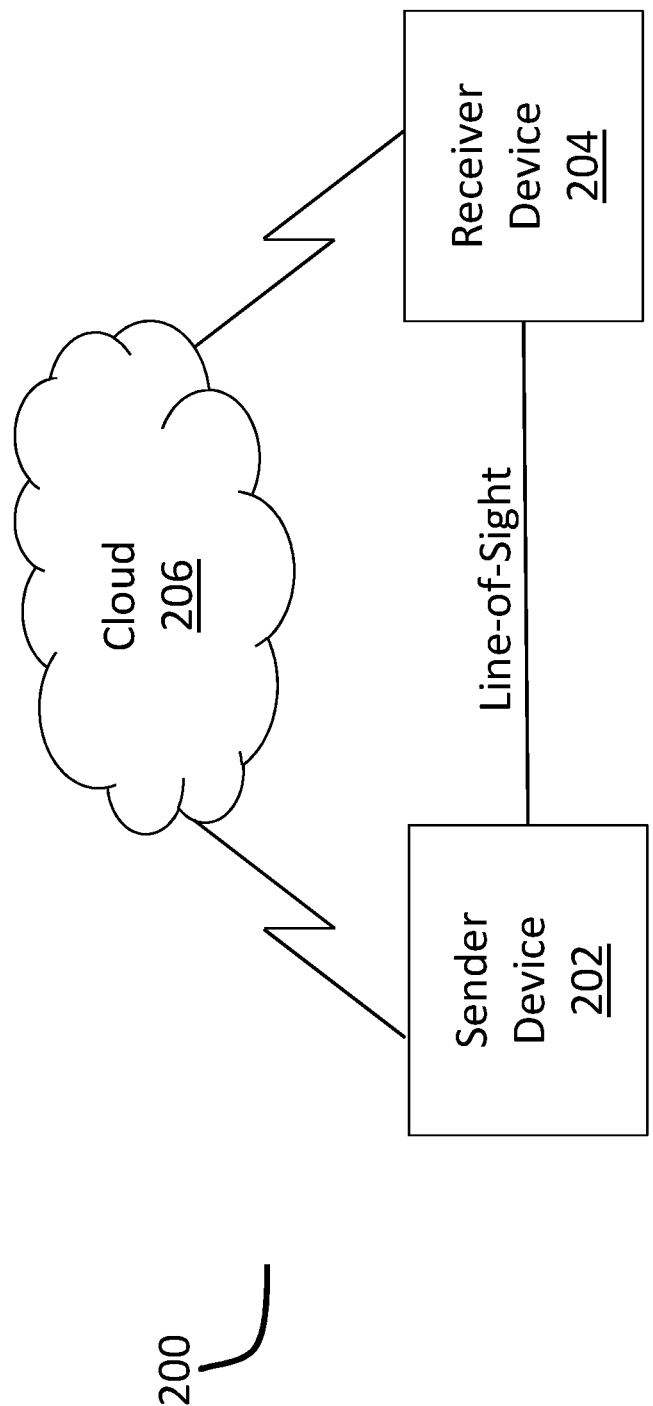
FIG. 2 illustrates devices and a network for performing gesture based smart download in a cloud environment in accordance with one or more embodiments.

Turning now to FIG. 2, devices and a network for performing gesture based smart download in a cloud environment 200 are generally shown in accordance with one or more embodiments. FIG. 2 depicts a sender device 202, a receiver device 204 in line-of-sight of the sender device 202, and a cloud network 206. As shown in FIG. 2, both the sender device 202 and the receiver device 204 are in communication with the cloud network 206. In addition, the sender device 202 and the receiver device 204 are in line-of-sight with each other and can communicate with each other directly via, for example IR or other wireless technology. In terms of authentication, if a user already has write access to multiple devices within a cloud network 206, then the user can automatically connect to these devices within the cloud network 206 without having to log in and out each time of use.

In one or more embodiments, the data is transferred by copying the data from a storage location in the cloud network 206 to the receiver device 204. In another embodiment, the data is transferred directly between the sender device 204 and the receiver device 204 via a wireless network.

An example follows that uses a smart phone as the sender device 202 and a monitor as the receiver device 204. In this example, the user is in a cloud environment where they have access to all devices within a location (e.g., their home or office), and the smart phone is the key activator for the data transfer. As used herein, the term "key activator" means that the actions are started from the user's smart phone in order to allow transfer of data to the line-of-sight devices. The user selects the data that they want to transfer from the sender device 202 to the receiver device 204, and then performs a gesture over/on their smart phone in order to start the transfer. An application on the smart phone can start the transfer automatically in response to the gesture, or the smart phone can have an interrupt to verify that the user really wants to transfer the data. In one or more embodiments, the user can perform a gesture that is programmed into the smart phone that indicates the user verification of the transfer. In one or more embodiments, the smart phone sends a signal (e.g., an IR signal) to the device (e.g., the monitor) that is in the line-of-sight of the smart phone. In one or more embodiments, a command will be sent to the receiver device 204 to see if it accepts the data format and requested use. If the receiver device 204 allows such, then the exchange happens automatically between the sender device 202 (e.g., smart phone) and the receiver device 204 (e.g., display).

Figure 3:
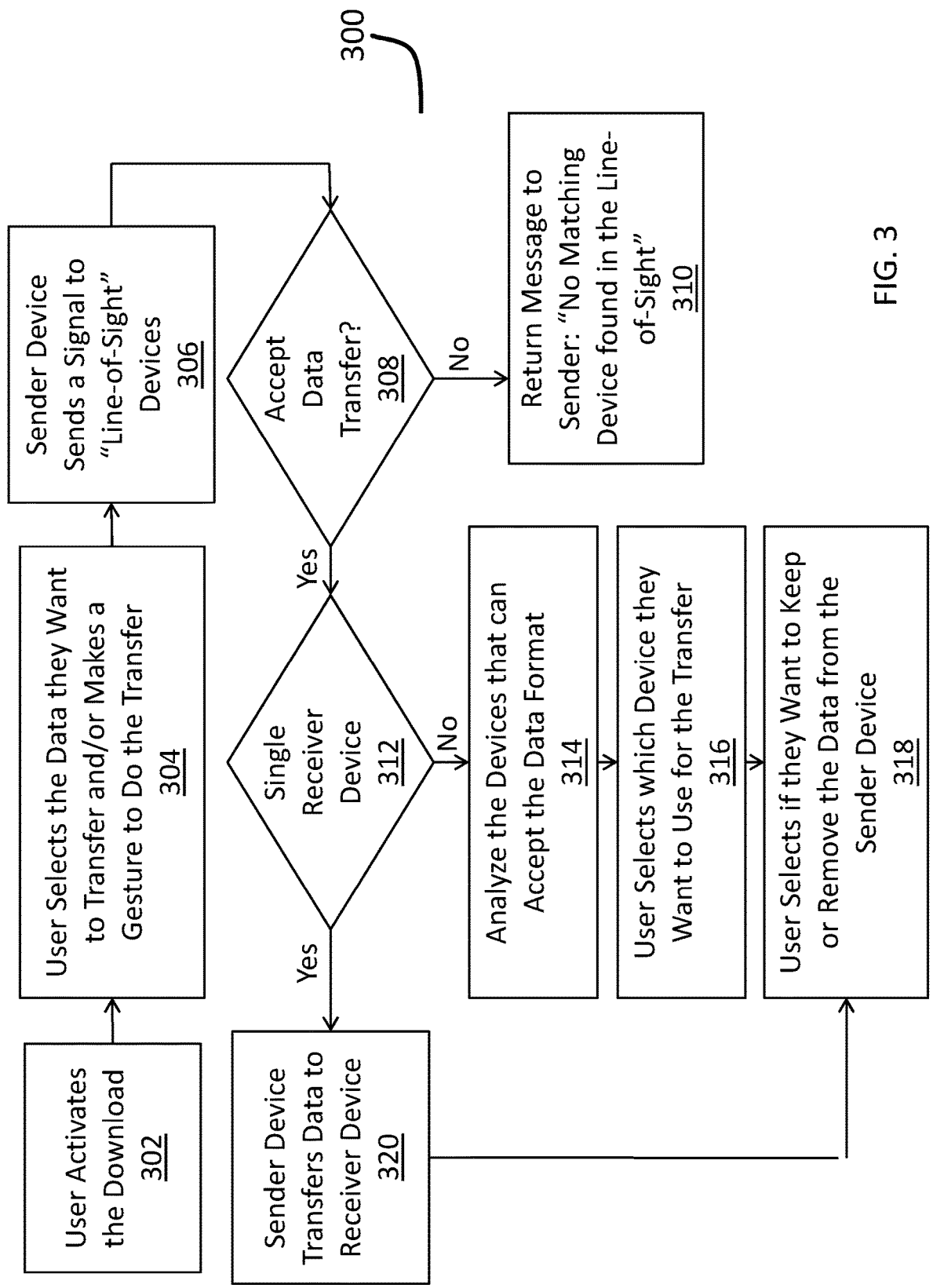
FIG. 3 illustrates a flow diagram for performing gesture based smart download in accordance with one or more embodiments.

Turning now to FIG. 3, a flow diagram 300 for performing gesture based smart download is generally shown in accordance with one or more embodiments. The processing in the flow diagram 300 shown in FIG. 3 can performed using a processor located on a sender device. At block 302, a user at a sender device activates a process to initiate a download, or transfer of data, from the sender device to another (receiver) device. At block, 304, the user selects the data they want to transfer, for example, by selecting the data currently displayed on the sender device or by selecting a file name. In addition, the user can specify an action to be performed on the data once it is transferred. Alternatively, the action can be determined automatically by the sender device based, for example, on a format of the data and/or recent actions associated with the use of the data by the user. The user makes a gesture to start the transfer and to indicate a direction relative to the sender device.

At block 306, the sender device sends a signal to locate a line-of-sight device(s) in the direction relative to the sender device indicated by the user gesture. These located devices are candidate receiver devices for receiving the transferred data. It is determined at block 308 whether any of the one or more candidate receiver devices are configured to accept the data and configured to perform the action. In a cloud environment, this can be performed by accessing configuration information about the one or more candidate receiver devices via a cloud network. In non-cloud environments, this can be performed by querying the one or more candidate receiver devices.

A message indicating that no matching devices were found in the line-of-sight is returned to the user at the sender device at block 308 if it is determined that none of the candidate receiver devices can accept the data transfer. If it is determined at block 308, that at least one candidate receiver device can accept the data transfer, then processing continues at block 312, where it is determined whether more than one candidate receiver devices can accept the data transfer based on both the format of the data and the action to be performed on the data. If just one candidate receiver device can accept the data transfer, then processing continues at block 320 where the sender device sends the data to the candidate receiver device that can accept the data transfer.

If it is determined that multiple candidate receiver devices can accept the data transfer, then processing continues at block 314 to determine which candidate device(s) to transfer the data to. The analysis at block 314 can include generating a list of the candidate receiver devices for output as receiver device options to the user. The list can include all (or a subset) of the candidate devices with enough storage to accept the data packets and preform the action requested. The list can be ordered based on a variety of factors such as, but not limited to: frequency of previous use by the user for the particular type (format) of the data and/or the action(s) to be performed on the data; most recently used by the user; and other preferences specified by the user. At block 316, the user at the sender device selects which of the candidate receiver devices to use as the receiver device. In one or more embodiments, once the user makes the selection, the sender device determines an identifier of the candidate receiver device which corresponds to the selection. Based on the selection, the data is transferred to the selected receiver device.

At block 308, the user selects whether they want to keep or remove the data from the sender device after the transfer to the receiver device is complete. Based on the user selection, the data is kept or deleted from the sender device.

In one or more embodiments, the list of options presented to the user includes candidate receiver devices that are configured to support the data format but are not configured to perform the requested action on the data. For example, the requested action may be to execute a database application, and the user can select a candidate device that can display the database data but cannot execute the database application. In this manner, the data can be transferred to a receiver device which is configured to accept the data and not configured to perform the action.

Figure 4:
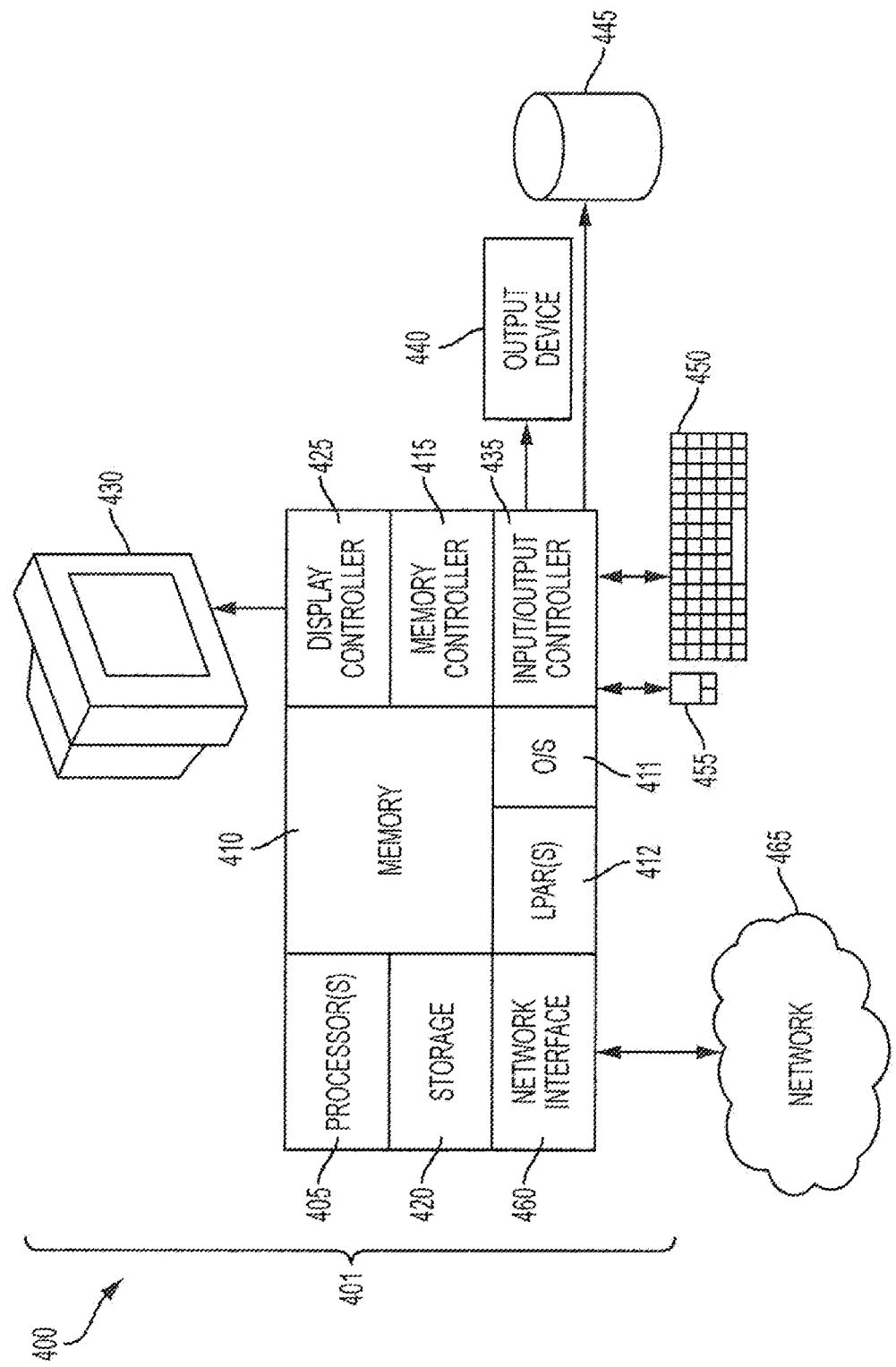
FIG. 4 illustrates a computer system for performing gesture based smart download in accordance with one or more embodiments.

Turning now to FIG. 4, a computer system for performing gesture based smart download is generally shown according to one or more embodiments. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 400 therefore may include general-purpose computer or mainframe 401 capable of running multiple instances of an O/S simultaneously.

In an exemplary embodiment, in terms of hardware architecture, as shown in FIG. 4, the computer 401 includes one or more processors 405, memory 410 coupled to a memory controller 415, and one or more input and/or output (I/O) devices 440, 445 (or peripherals) that are communicatively coupled via a local input/output controller 435. The input/output controller 435 can be, for example but not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 435 may include a plurality of sub-channels configured to access the output devices 440 and 445. The sub-channels may include fiber-optic communications ports.

The processor 405 is a hardware device for executing software, particularly that stored in storage 420, such as cache storage, or memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing instructions.

The memory 410 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, and/or other types of storage media. Note that the memory 410 can have a distributed architecture, where various components are situated remote from one another, but can be accessed by the processor 405.

The instructions in memory 410 may include one or more separate programs, each of which comprises an ordered listing of executable instructions for implementing logical functions. In the example of FIG. 4, the instructions in the memory 410 a suitable operating system (OS) 411. The operating system 411 essentially controls the execution of other computer programs and provides scheduling, input-output control, file and data management, memory management, and communication control and related services.

The memory 410 may include multiple logical partitions (LPARs) 412, each running an instance of an operating system. The LPARs 412 may be managed by a hypervisor, which may be a program stored in memory 410 and executed by the processor 405.

In an exemplary embodiment, a conventional keyboard 450 and mouse 455 can be coupled to the input/output controller 435. Other output devices such as the I/O devices 440, 445 may include input devices, for example but not limited to a printer, a scanner, microphone, and the like.

Finally, the I/O devices 440, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 400 can further include a display controller 425 coupled to a display 430. In an exemplary embodiment, the system 400 can further include a network interface 460 for coupling to a network 465. The network 465 can be an IP-based network for communication between the computer 401 and any external server, client and the like via a broadband connection. The network 465 transmits and receives data between the computer 401 and external systems. In an exemplary embodiment, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the instructions in the memory 410 may further include a basic input output system (BIOS) (omitted for simplicity). The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute instructions stored within the memory 410, to communicate data to and from the memory 410, and to generally control operations of the computer 401 pursuant to the instructions.

In an exemplary embodiment, the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    detecting a user gesture at a sender device, the user gesture indicating a direction relative to the sender device, the direction wider than a straight line by a user adjustable number of degrees;
    locating one or more candidate receiver devices in the direction relative to the sender device and in a line-of-sight of the sender device;
    identifying data to be transferred by the sender device and a program for executing an action on the data, wherein the data is in a first data format;
    determining whether any of the one or more candidate receiver devices are configured to accept the data and to execute the program, the determining comprising requesting, via a network, an external device to verify whether each of the one or more candidate receiver devices are configured to accept the data and to execute the program, and receiving results of the verifying from the external device;
    transferring the data to a selected one of the one or more candidate receiver devices based on determining that the selected candidate receiver device is configured to accept the data and to execute the program;
    based on determining that none of the one or more candidate receiver devices are configured to accept the data and to execute the program, indicating to the user that no line-of-sight devices are available to accept the data and to execute the program;
    based on determining that at least one of the candidate receiver devices is configured to accept the data and not configured to execute the program, presenting the user with an identifier of the at least one candidate receiver device configured to accept the data and not configured to execute the program;
    receiving a request from the user to transfer the data to the at least one candidate receiver device configured to accept the data and not configured to execute the program, wherein the at least one candidate receiver device is configured to execute a second program different than the program, the second program for executing a second action different than the action on the data, wherein the second action is performed on the data without changing a format of the data to a format different than the first data format and the second action is performed on the data subsequent to the data being stored on the at least one candidate receiver device; and
    based on receiving the request, transferring the data in the first data format to the at least one candidate receiver device configured to accept the data and not configured to execute the program.

2. The method of claim 1, wherein the external device accesses configuration information about the one or more candidate receiver devices via the network.

3. The method of claim 1, wherein the determining further comprises querying the one or more candidate receiver devices.

4. The method of claim 1, wherein the user gesture includes a swipe on a touch screen of the sender device.

5. The method of claim 1, wherein the user gesture includes a movement of the sender device.

6. The method of claim 1, wherein a plurality of candidate receiver devices are determined to be configured to accept the data and to execute the program, and the method further comprises:
- presenting the user with identifiers of the plurality of candidate receiver devices that are determined to be configured to accept the data and to execute the program; and
- receiving an identifier corresponding to the selected one of the one or more candidate receiver devices in response to the presenting.

7. The method of claim 1, further comprising:
deleting the data from the sender device subsequent to the transferring.

8. The method of claim 1, wherein the data is transferred from a storage location in the network to the selected one of the one or more candidate receiver devices.

9. A system comprising:
- a memory having computer readable instructions; and
- a processor for executing the computer readable instructions, the computer readable instructions including:
  - detecting a user gesture at a sender device, the user gesture indicating a direction relative to the sender device, the direction wider than a straight line by a user adjustable number of degrees;
  - locating one or more candidate receiver devices in the direction relative to the sender device and in a line-of-sight of the sender device;
  - identifying data to be transferred by the sender device and a program for executing an action on the data, wherein the data is in a first data format;
  - determining whether any of the one or more candidate receiver devices are configured to accept the data and to execute the program, the determining comprising requesting, via a network, an external device to verify whether each of the one or more candidate receiver devices are configured to accept the data and to execute the program, and receiving results of the verifying from the external device;
  - transferring the data to a selected one of the one or more candidate receiver devices based on determining that the selected candidate receiver device is configured to accept the data and to execute the program;
  - based on determining that none of the one or more candidate receiver devices are configured to accept the data and to execute the program, indicating to the user that no line-of-sight devices are available to accept the data and to execute the program;
  - based on determining that at least one of the candidate receiver devices is configured to accept the data and not configured to execute the program, presenting the user with an identifier of the at least one candidate receiver device configured to accept the data and not configured to execute the program;
  - receiving a request from the user to transfer the data to the at least one candidate receiver device configured to accept the data and not configured to execute the program, wherein the at least one candidate receiver device is configured to execute a second program different than the program, the second program for executing a second action different than the action on the data, wherein the second action is performed on the data without changing a format of the data to a format different than the first data format and the second action is performed on the data subsequent to the data being stored on the at least one candidate receiver device; and
  - based on receiving the request, transferring the data in the first data format to the at least one candidate receiver device configured to accept the data and not configured to execute the program.

10. The system of claim 9, wherein the external device accesses configuration information about the one or more candidate receiver devices via the network.

11. The system of claim 9, wherein the determining further comprises querying the one or more candidate receiver devices.

12. The system of claim 9, wherein the user gesture includes a swipe on a touch screen of the sender device.

13. The system of claim 9, wherein the user gesture includes a movement of the sender device.

14. The system of claim 9, wherein a plurality of candidate receiver devices are determined to be configured to accept the data and to execute the program, and the computer readable instructions further include:
- presenting the user with identifiers of the plurality of candidate receiver devices that are determined to be configured to accept the data and to execute the program; and
- receiving an identifier corresponding to the selected one of the one or more candidate receiver devices in response to the presenting.

15. The system of claim 9, wherein the computer readable instructions further include:
deleting the data from the sender device subsequent to the transferring.

16. The system of claim 9, wherein the data is transferred from a storage location in the network to the selected one of the one or more candidate receiver devices.

17. A computer program product comprising a computer readable storage medium having program instructions embodied therewith, the program instructions executable by processing circuitry to cause the processing circuitry to perform:
- detecting a user gesture at a sender device, the user gesture indicating a direction relative to the sender device, the direction wider than a straight line by a user adjustable number of degrees;
- locating one or more candidate receiver devices in the direction relative to the sender device and in a line-of-sight of the sender device;
- identifying data to be transferred by the sender device and a program for executing an action on the data, wherein the data is in a first data format;
- determining whether any of the one or more candidate receiver devices are configured to accept the data and to execute the program, the determining comprising requesting, via a network, an external device to verify whether each of the one or more candidate receiver devices are configured to accept the data and to execute the program, and receiving results of the verifying from the external device;
- transferring the data to a selected one of the one or more candidate receiver devices based on determining that the selected candidate receiver device is configured to accept the data and to execute the program;

based on determining that none of the one or more candidate receiver devices are configured to accept the data and to perform the action, indicating to the user that no line-of-sight devices are available to accept the data and to execute the program;

based on determining that at least one of the candidate receiver devices is configured to accept the data and not configured to execute the program, presenting the user with an identifier of the at least one candidate receiver device configured to accept the data and not configured to execute the program;

receiving a request from the user to transfer the data to the at least one candidate receiver device configured to accept the data and not configured to execute the program, wherein the at least one candidate receiver device is configured to execute a second program different than the program, the second program for executing a second action different than the action on the data, wherein the second action is performed on the data without changing a format of the data to a format different than the first data format and the second action is performed on the data subsequent to the data being stored on the at least one candidate receiver device; and based on receiving the request, transferring the data in the first data format to the at least one candidate receiver device configured to accept the data and not configured to execute the program.

18. The computer program product of claim 17, wherein a plurality of candidate receiver devices are determined to be configured to accept the data and to execute the program, and the program instructions further cause the processing circuitry to perform:

presenting the user with identifiers of the plurality of candidate receiver devices that are determined to be configured to accept the data and to execute the program; and receiving an identifier corresponding to the selected one of the one or more candidate receiver devices in response to the presenting.

19. The computer program product of claim 17, wherein the program instructions further cause the processing circuitry to perform:

based on determining that at least one of the candidate receiver devices is configured to accept the data and not configured to execute the program, presenting the user with an identifier of the at least one candidate receiver device configured to accept the data and not configured to execute the program;

receiving a request from the user to transfer the data to the at least one candidate receiver device configured to accept the data and not configured to execute the program; and transferring the data to the at least one candidate receiver device configured to accept the data and not configured to execute the program.

20. The computer program product of claim 17, wherein the program instructions further cause the processing circuitry to perform:

deleting the data from the sender device subsequent to the transferring.

* * * * *